Figure 1:
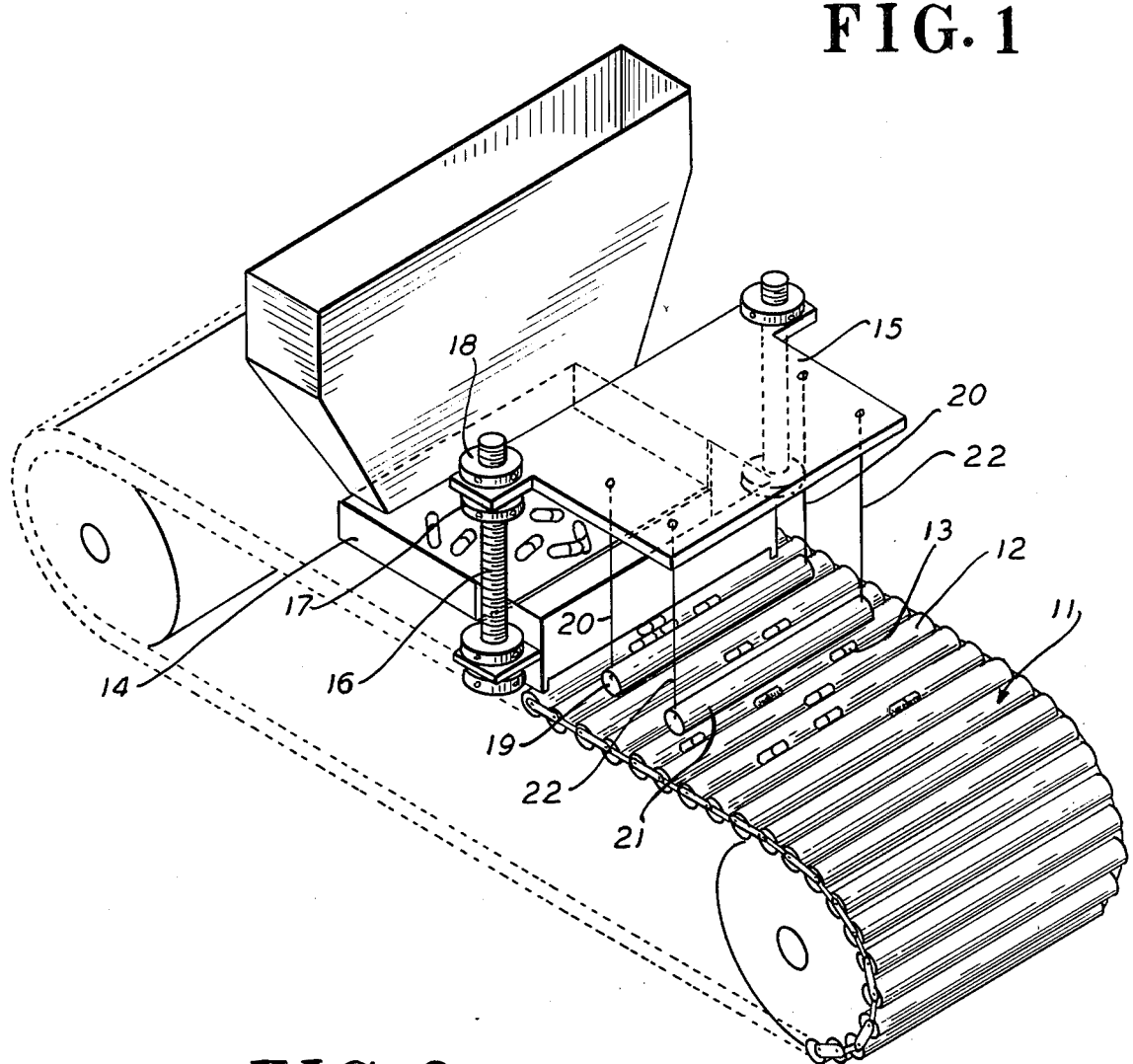

United States Patent [19]

Dragotta

[11] 4,116,323
[45] Sep. 26, 1978

[54] APPARATUS FOR CONVEYING OBJECTS ONE BY ONE

[76] Inventor: Peter J. Dragotta, 23 Franklin Pl., East Rutherford, N.J. 07073

[21] Appl. No.: 811,048

[22] Filed: Jun. 29, 1977

[51] Int. Cl.$^2$ ............................................. B65G 47/14
[52] U.S. Cl. .................................. 198/453; 198/534; 198/599; 222/350
[58] Field of Search ............... 198/393, 396, 397, 443, 198/446, 453, 454, 455, 525, 530, 533, 534, 599, 633, 635, 779; 222/346, 350, 352

[56] References Cited

U.S. PATENT DOCUMENTS

| | | | |
|---|---|---|---|
| 1,236,019 | 8/1917 | Tzibides | 198/454 |
| 2,916,133 | 12/1959 | Copping | 198/397 |
| 3,168,186 | 2/1965 | Young | 198/396 |
| 3,556,281 | 1/1971 | Margaroli et al. | 198/393 |
| 3,794,161 | 2/1974 | Peterson | 198/779 |

Primary Examiner—Evon C. Blunk
Assistant Examiner—Richard K. Thomson
Attorney, Agent, or Firm—Norman N. Popper; Daniel H. Bobis

[57] ABSTRACT

A conveyor having a plurality of indentations sufficiently wide to receive a single article and a bar transverse to the movement of the conveyor, the bar being suspended from filaments above the conveyor a distance sufficient to pass a single layer of articles and to gently nudge superposed articles into a successive unoccupied indentation.

3 Claims, 2 Drawing Figures

U.S. Patent — Sept. 26, 1978 — 4,116,323

APPARATUS FOR CONVEYING OBJECTS ONE BY ONE

BACKGROUND OF INVENTION

1. Field of Invention

This invention relates generally to conveyors, and particularly to conveyors wherein means is provided to dispose articles in a single layer and to remove superposed articles and nudge them into successive unoccupied indentations.

2. Prior Art

In many industries small components and other objects are produced, and these components are subjected to visual inspection to determine conformity to certain visual standards and to enable the rejection of those components which do not conform to such standards. This type of inspection is also utilized in the pharmaceutical industry wherein visual inspection is utilized to determine whether capsules are completely filled. In order that the inspection of the components or capsules may be proceeded with in an efficient manner, the components or capsules must be disposed separately on a conveyor. The same positioning of components is desirable as a prepackaging expedient such as assemblying cigarettes for incorporation in a package. To satisfy the need for disposing the components or capsules individually and not superposed, numerous devices have been provided, such as brushes to insure a single layer of articles on a conveyor belt, rigid bars so that only a single article on the conveyor belt can pass under the bar, a succession of obstructions successively reducing superposed articles to a single layer, vibrating tables. The rigid bars may inflict damage upon the components that are superposed, the same is true of brushes, depending upon the deflectability of the bristles. Minute electronic components, and delicate capsules are particularly subject to damage for they may become jammed inbetween pockets in a conveyor and a leveling device.

SUMMARY OF THE INVENTION

It has been found that a relatively sure means of singlely depositing objects to be inspected in indentations in a conveyor belt can be provided that will not cause damage to delicate components. A platform is provided over a moving endless conveyor belt, and one or more bars are suspended on filaments from the platform. The suspension is such that the bar leaves a space between the bottom of the bar and objects in the indentations of the conveyor belt, which space is sufficient to pass only a single layer of articles, thereby nudging superposed articles from above the single layer into a single layer of articles on successive unoccupied indentations. The bar has sufficient weight so that it will gently nudge the articles from superposed position to successive unoccupied indentations, and yet the bar is deflectable by the superposed articles so as not to cause any damage to them in the process of reorienting them. The weight of the bar, and as well, the frictional engagement of the bar accomplishes this.

DRAWINGS

Figure 2:
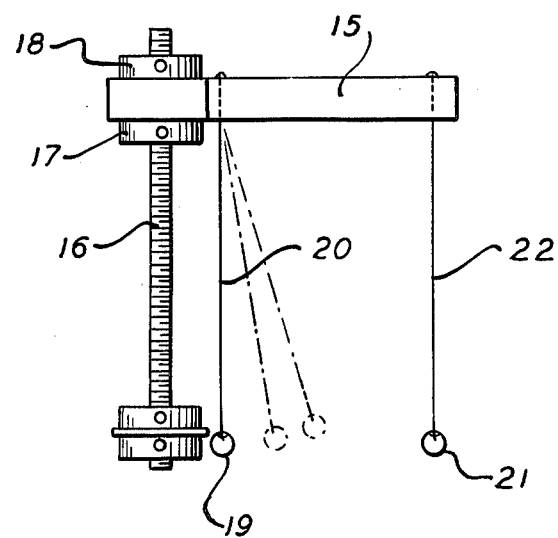

These objects and advantages as well as other objects and advantages may be attained by the device shown by way of illustration in the drawings in which, FIG. 1 is a perspective view of the apparatus disposed over a conveyor belt for transporting medicaments in gelatin capsules; and FIG. 2 is a side elevational view showing the apparatus.

PREFERRED EMBODIMENT

Referring now to the drawings in detail, an endless conveyor belt 11 is provided, driven by any suitable means such as an electric motor. The belt is provided with a plurality of transverse indentations or spaces between successive transverse members 12. Minute objects such as gelatin capsules 13 are delivered to the conveyor belt 11 by a tilted vibrating table 14 or any other suitable means such as a hopper. A support plate 15 is mounted on vertical rods 16. The rods 16 are threaded and supported on nuts so that the height of the support plate 15 can be adjusted upwardly and downwardly. Once the nuts are adjusted to support the plate 15 at the proper height, threaded retainer knobs 18 are tightened to fix the adjustment. A first bar or rod 19 is suspended at each end from the plate 15 by filaments 20. These filaments 20 may be nylon threads which are attached to the top end to the plate 15 and at the bottom end to the rod 19. A second bar or rod 21 is also provided and is similarly attached by filaments 22 to the support plate 15. To permit ready inspection of the performance of the rods 19, 21, the support plate 15 is preferably transparent. When the gelatin capsules 13 or other minute objects leave the tilted vibrating table and fall to the endless conveyor belt 11, they may assume random positioning and be stacked on top of each other in the transverse indentations in the belt 11. Unlike vibrating conveyor belts, stationary wipers, brushes, or superposed rollers, the rods 17, 19 which are disposed over the conveyor belt 11 at the height of one capsule 13, are gently deflected by superposed capsules and swing back and forth gently nudging the capsules from superposed position to single position in the transverse indentations 12. No damage is sustained by the capsules or small delicate objects such as electronic components. The continuous swinging motion imparted to the rods 19, 21 by the objects accomplishes satisfactory distribution of components so as to enable visual inspection to determine the presence of incomplete filling, damage to capsules and the like, without interference from superposed capsules.

The mere weight of the bars 17, 19 may be sufficient to nudge a superposed article into a successive unoccupied space. Further frictional contact of the bars 17, 19 may contribute to the displacement of superposed items.

One end of each of the bars 17, 19 may be made heavier than the opposite end. The swing of the bars 17, 19 in displacing articles may become random and irregular, and not continuously parallel to the spaces, and this creates a somewhat more forceful leveling effect.

What is claimed is:

1. An apparatus for singulating superposed objects on a conveyor for inspection comprising:
   a. a conveyor for articles,
   b. a plurality of transverse, successive spaces on the conveyor,
   c. the spaces on the conveyor dimensioned generally to receive only a single layer of articles,
   d. means to operate the conveyor from an article delivery station to an article discharge station,
   e. a stationary support for a bar disposed over the conveyor,
   f. means to deflectively suspend a bar, attached at one end to the stationary support, and at the other end to the bar, g. a bar attached to the means to support and disposed transversely with respect to the direction of movement of the conveyor, h. the bar further disposed in spaced relation to the spaces on the conveyor a distance sufficient to pass a single article on a space, but insufficient to pass an article superposed on another article on a space on the conveyor, i. the weight of the bar being sufficient to displace a superposed article on the moving conveyor that the bar encounters, and to move it onto a successive empty space on the conveyor.

2. An apparatus for singulating superposed objects on a conveyor for inspection comprising:

a. the device according to claim 1, and b. the bar being heavier at one end than at the other, thereby to swing in a random, irregular manner when deflected by a superposed article.

3. A method for singulating superposed objects on a moving conveyor comprising:

a. providing a conveyor having a plurality of transverse spaces thereon generally dimensioned to receive a single article, b. moving the conveyor from an article delivery station to an article discharge station, c. suspending a freely deflective bar over the conveyor a distance sufficient to pass unimpeded, a single article in a space on the conveyor, but insufficient to pass an article superposed on another article on the conveyor, d. delivering a plurality of articles to the conveyor, e. nudging superposed articles by the bar into successive, unoccupied spaces on the conveyor as the bar encounters them.

* * * * *